US010959380B2

(12) United States Patent
Murray et al.

(10) Patent No.: US 10,959,380 B2
(45) Date of Patent: Mar. 30, 2021

(54) SIEVE FOR AN AGRICULTURAL HARVESTER WITH ADJUSTABLE LOUVERS AND ASSOCIATED ADJUSTMENT ASSEMBLY

(71) Applicant: CNH Industrial America LLC, New Holland, PA (US)

(72) Inventors: Craig E. Murray, Davenport, IA (US); Harold Mark Stock, Bettendorf, IA (US); Kevin S. Schwinn, Fairmount, IN (US)

(73) Assignee: CNH Industrial America LLC, New Holland, PA (US)

( * ) Notice: Subject to any disclaimer, the term of this patent is extended or adjusted under 35 U.S.C. 154(b) by 197 days.

(21) Appl. No.: 16/299,933

(22) Filed: Mar. 12, 2019

(65) Prior Publication Data

US 2020/0288638 A1   Sep. 17, 2020

(51) Int. Cl.
*A01F 12/44*   (2006.01)
*B07B 1/12*   (2006.01)

(52) U.S. Cl.
CPC .......... *A01F 12/448* (2013.01); *A01F 12/446* (2013.01); *B07B 1/12* (2013.01)

(58) Field of Classification Search
CPC ...... A01F 12/448; A01F 12/446; A01F 12/34; A01F 12/44; B07B 1/12; B07B 1/04; B07B 1/4636; A01D 41/1276
See application file for complete search history.

(56) References Cited

U.S. PATENT DOCUMENTS

| | | | |
|---|---|---|---|
| 1,366,691 A | | 1/1921 | Humbke |
| 1,383,918 A | * | 7/1921 | Fadness ................ A01F 12/448 209/319 |
| 2,253,296 A | | 8/1941 | Holtzman |
| 2,362,099 A | * | 11/1944 | Sargent ..................... B07B 1/12 209/394 |

(Continued)

FOREIGN PATENT DOCUMENTS

| | | |
|---|---|---|
| DE | 10025030 A1 | 11/2001 |
| EP | 1068792 A1 * | 1/2001 ........... A01F 12/448 |
| JP | 06022634 A * | 2/1994 ............. A01F 12/32 |

OTHER PUBLICATIONS

Extended European Search Report for EP Application No. 20161631.5 dated Jul. 22, 2020 (six pages).

*Primary Examiner* — Arpad Fabian-Kovacs
(74) *Attorney, Agent, or Firm* — Peter Zacharias; Patrick Sheldrake

(57) ABSTRACT

A sieve for a cleaning system of an agricultural harvester includes: a sieve frame defining a top side; adjustable louvers carried by the sieve frame and defining apertures; an adjustment bar coupled to the adjustable louvers such that displacement of the adjustment bar changes a size of at least some of the apertures; and an adjustment assembly. The adjustment assembly includes: an adjustment arm coupled to the adjustment bar and pivotable relative to the sieve frame such that pivoting of the adjustment arm about a pivot axis displaces the adjustment bar. The adjustment arm carries a locking pin. A shaft is disposed on the top side and coupled to the adjustment arm. Displacement of the shaft from a first position to a second position causes a corresponding displacement of the locking pin from a locking position to an adjustment position.

20 Claims, 6 Drawing Sheets

(56) References Cited

U.S. PATENT DOCUMENTS

| | | | |
|---|---|---|---|
| 2,423,026 A | 6/1947 | Holtzman | |
| 3,021,009 A * | 2/1962 | Scott | B07B 1/04 |
| | | | 209/394 |
| 3,385,438 A * | 5/1968 | Fisher | B07B 1/46 |
| | | | 209/394 |
| 4,259,829 A * | 4/1981 | Strubbe | A01D 41/1276 |
| | | | 460/1 |
| 4,502,493 A | 3/1985 | Jones et al. | |
| 4,712,568 A | 12/1987 | Strong et al. | |
| 4,770,190 A | 9/1988 | Barnett | |
| 4,863,415 A * | 9/1989 | Carnewal | A01F 12/44 |
| | | | 460/101 |
| 4,897,071 A | 1/1990 | Desnijder et al. | |
| 5,462,174 A * | 10/1995 | Truckenbrod | A01F 12/446 |
| | | | 209/394 |
| 5,489,029 A | 2/1996 | Jonckheere et al. | |
| 6,053,812 A * | 4/2000 | Loewen | A01F 12/446 |
| | | | 460/101 |
| 6,117,006 A * | 9/2000 | Hofer | A01F 12/448 |
| | | | 460/101 |
| 6,468,154 B1 * | 10/2002 | Eggenhaus | A01F 12/448 |
| | | | 460/101 |
| 6,953,397 B2 | 10/2005 | Jonckheere et al. | |
| 7,322,882 B2 * | 1/2008 | Duquesne | A01D 75/282 |
| | | | 209/233 |
| 7,371,162 B2 * | 5/2008 | Matousek | A01F 12/448 |
| | | | 460/101 |
| 7,946,908 B2 * | 5/2011 | Lobdell | A01D 75/282 |
| | | | 460/101 |
| 8,622,792 B1 | 1/2014 | Murray | |
| 2002/0128054 A1 * | 9/2002 | Lauer | A01D 41/1276 |
| | | | 460/101 |
| 2002/0183103 A1 * | 12/2002 | Anderson | A01F 12/448 |
| | | | 460/101 |
| 2010/0113113 A1 * | 5/2010 | Ricketts | A01F 12/448 |
| | | | 460/101 |
| 2016/0014964 A1 * | 1/2016 | Deng | A01F 12/448 |
| | | | 460/101 |
| 2019/0082597 A1 * | 3/2019 | Maney | A01D 41/1276 |

* cited by examiner

SIEVE FOR AN AGRICULTURAL HARVESTER WITH ADJUSTABLE LOUVERS AND ASSOCIATED ADJUSTMENT ASSEMBLY

FIELD OF THE INVENTION

The present invention pertains to an agricultural harvester and, more specifically, to a sieve for a cleaning system of an agricultural harvester.

BACKGROUND OF THE INVENTION

An agricultural harvester known as a "combine" is historically termed such because it combines multiple harvesting functions with a single harvesting unit, such as picking, threshing, separating, and cleaning. A combine includes a header which removes the crop from a field, and a feeder housing which transports the crop matter into a threshing rotor. The threshing rotor rotates within a perforated housing, which may be in the form of adjustable concaves, and performs a threshing operation on the crop to remove the grain. Once the grain is threshed it falls through perforations in the concaves onto a grain pan. From the grain pan the grain is cleaned using a cleaning system, and is then transported to a grain tank onboard the combine. A cleaning fan blows air through the sieves to discharge chaff and other debris toward the rear of the combine. Non-grain crop material such as straw from the threshing section proceeds through a residue handling system, which may utilize a straw chopper to process the non-grain material and direct it out the rear of the combine. When the grain tank becomes full, the combine is positioned adjacent a vehicle into which the grain is to be unloaded, such as a semi-trailer, gravity box, straight truck, or the like, and an unloading system on the combine is actuated to transfer the grain into the vehicle.

More particularly, a rotary threshing or separating system includes one or more rotors that can extend axially (front to rear) or transversely (side to side) within the body of the combine, and which are partially or fully surrounded by perforated concaves. The crop material is threshed and separated by the rotation of the rotor within the concaves. Coarser non-grain crop material such as stalks and leaves pass through a straw beater to remove any remaining grains, and then are transported to the rear of the combine and discharged back to the field. The separated grain, together with some finer non-grain crop material such as chaff, dust, straw, and other crop residue are discharged through the concaves and fall onto a grain pan where they are transported to a cleaning system. Alternatively, the grain and finer non-grain crop material may also fall directly onto the cleaning system itself.

A cleaning system further separates the grain from non-grain crop material, and typically includes a fan directing an airflow stream upwardly and rearwardly through vertically arranged sieves which oscillate in a fore and aft manner. The airflow stream lifts and carries the lighter non-grain crop material towards the rear end of the combine for discharge to the field. Clean grain, being heavier, and larger pieces of non-grain crop material, which are not carried away by the airflow stream, fall onto a surface of an upper sieve (also known as a chaffer sieve), where some or all of the clean grain passes through to a lower sieve (also known as a cleaning sieve). Grain and non-grain crop material remaining on the upper and lower sieves are physically separated by the reciprocating action of the sieves as the material moves rearwardly. Any grain and/or non-grain crop material which passes through the upper sieve, but does not pass through the lower sieve, is directed to a tailings pan. Grain falling through the lower sieve lands on a bottom pan of the cleaning system, where it is conveyed forwardly toward a clean grain auger. The clean grain auger conveys the grain to a grain elevator, which transports the grain upwards to a grain tank for temporary storage. The grain accumulates to the point where the grain tank is full and is discharged to an adjacent vehicle such as a semi trailer, gravity box, straight truck or the like by an unloading system on the combine that is actuated to transfer grain into the vehicle.

One or more of the sieves, such as the lower sieve, includes a plurality of apertures that may be adjusted by moving one or more louvers of the sieve. The size of the apertures controls the size of particles that are allowed to pass through the sieve. In known combine harvesters, it is difficult and time-consuming for a user to adjust the size of the apertures because the adjustment mechanism is difficult to access.

What is needed in the art is a sieve for a cleaning system of an agricultural harvester with apertures that may be conveniently and easily adjusted.

SUMMARY OF THE INVENTION

Exemplary embodiments disclosed herein provide a sieve with an adjustment assembly having a pivotable adjustment arm that is coupled to an adjustment bar and carries a locking pin, as well as a shaft coupled to the adjustment arm and being displaceable to displace the locking pin from a locking position to an adjustment position.

In some exemplary embodiments provided in accordance with the present disclosure, a sieve for a cleaning system of an agricultural harvester includes: a sieve frame defining a top side; a plurality of adjustable louvers carried by the sieve frame and defining a plurality of apertures; at least one adjustment bar coupled to the plurality of adjustable louvers such that displacement of the at least one adjustment bar changes a size of at least some of the plurality of apertures; and an adjustment assembly. The adjustment assembly includes: an adjustment arm coupled to the at least one adjustment bar and pivotable relative to the sieve frame such that pivoting of the adjustment arm about a pivot axis displaces the at least one adjustment bar. The adjustment arm carries a locking pin that is displaceable between a locking position where the adjustment arm is not freely pivotable about the pivot axis and an adjustment position where the adjustment arm is freely pivotable about the pivot axis. A shaft is disposed on the top side and coupled to the adjustment arm, the shaft being displaceable such that displacement of the shaft from a first position to a second position causes a corresponding displacement of the locking pin from the locking position to the adjustment position.

In some exemplary embodiments provided in accordance with the present disclosure, a cleaning system for an agricultural harvester includes a sieve. The sieve includes: a sieve frame defining a top side; a plurality of adjustable louvers carried by the sieve frame and defining a plurality of apertures; at least one adjustment bar coupled to the plurality of adjustable louvers such that displacement of the at least one adjustment bar changes a size of at least some of the plurality of apertures; and an adjustment assembly. The adjustment assembly includes: an adjustment arm coupled to the at least one adjustment bar and pivotable relative to the sieve frame such that pivoting of the adjustment arm about a pivot axis displaces the at least one adjustment bar. The adjustment arm carries a locking pin that is displaceable between a locking position where the adjustment arm is not freely pivotable about the pivot axis and an adjustment position where the adjustment arm is freely pivotable about the pivot axis. A shaft is disposed on the top side and coupled to the adjustment arm, the shaft being displaceable such that displacement of the shaft from a first position to a second position causes a corresponding displacement of the locking pin from the locking position to the adjustment position. A clean grain auger is disposed below the sieve and configured to receive clean crop material that passes through the apertures.

In some exemplary embodiments provided in accordance with the present disclosure, an agricultural harvester includes a chassis and a cleaning system carried by the chassis. The cleaning system includes a sieve. The sieve includes: a sieve frame; a plurality of adjustable louvers carried by the sieve frame and defining a plurality of apertures; at least one adjustment bar coupled to the plurality of adjustable louvers such that displacement of the at least one adjustment bar changes a size of at least some of the plurality of apertures; and an adjustment assembly. The adjustment assembly includes: an adjustment arm coupled to the at least one adjustment bar and pivotable relative to the sieve frame such that pivoting of the adjustment arm about a pivot axis displaces the at least one adjustment bar. The adjustment arm carries a locking pin that is displaceable between a locking position where the adjustment arm is not freely pivotable about the pivot axis and an adjustment position where the adjustment arm is freely pivotable about the pivot axis. A shaft is disposed on the top side and couples to the adjustment arm, the shaft being displaceable such that displacement of the shaft from a first position to a second position causes a corresponding displacement of the locking pin from the locking position to the adjustment position. A clean grain auger is disposed below the sieve and configured to receive clean crop material that passes through the apertures.

A possible advantage that may be realized by exemplary embodiments provided in accordance with the present disclosure is that the spacing of the louvers and the defined apertures may be easily and conveniently adjusted by displacing the shaft and pivoting the adjustment arm.

Another possible advantage that may be realized by exemplary embodiments provided in accordance with the present disclosure is that the shaft can be configured for engagement with a wrench or other tool to both unlock and pivot the adjustment arm.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also, the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting. The terms "downstream" and "upstream" are determined with reference to the intended direction of crop material flow during operation, with "downstream" being analogous to "rearward" and "upstream" being analogous to "forward."

Figure 1:
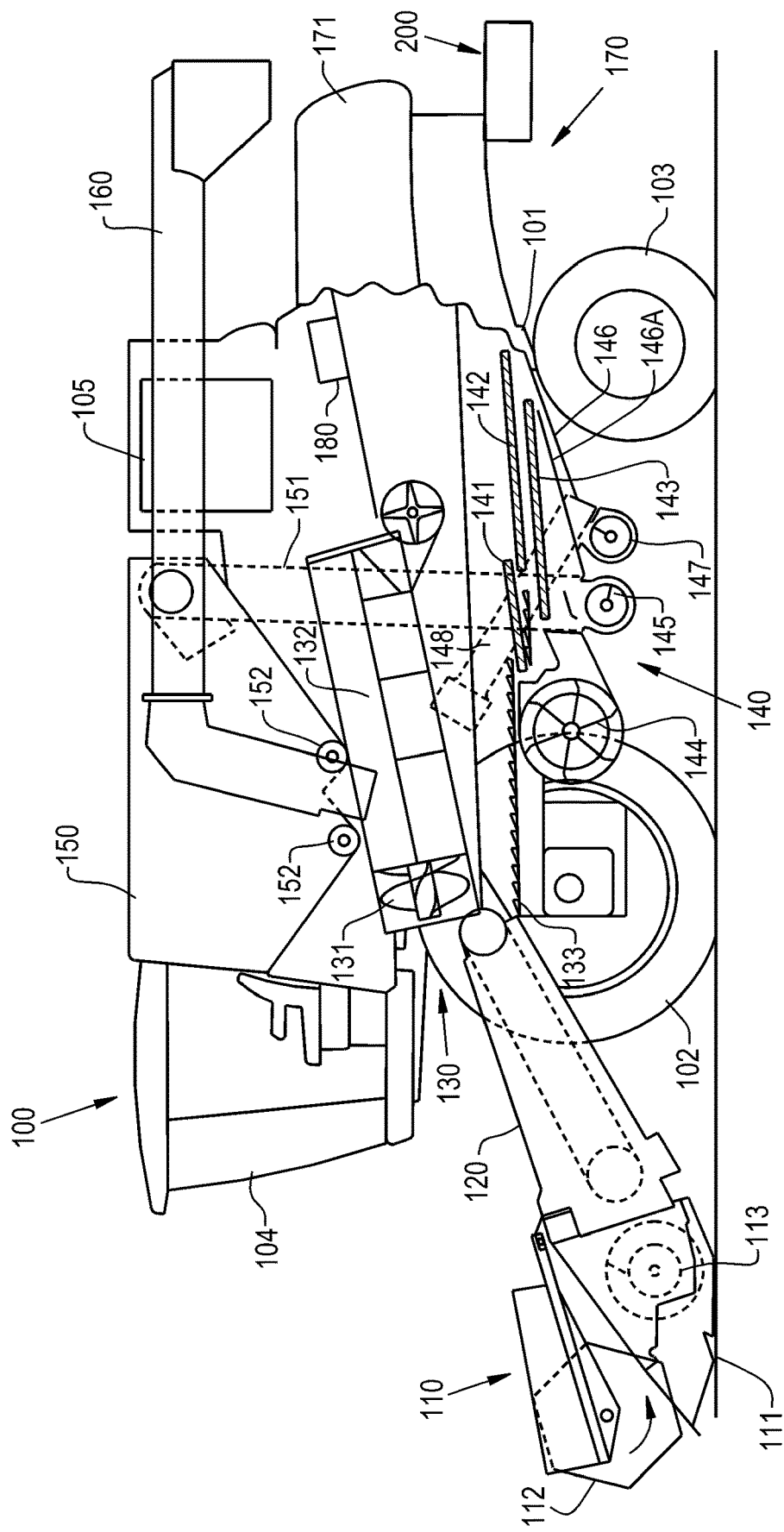
FIG. 1 illustrates a side view of an exemplary embodiment of an agricultural vehicle, the agricultural vehicle comprising a cleaning system including a sieve, in accordance with an exemplary embodiment of the present disclosure.
Figure 2:
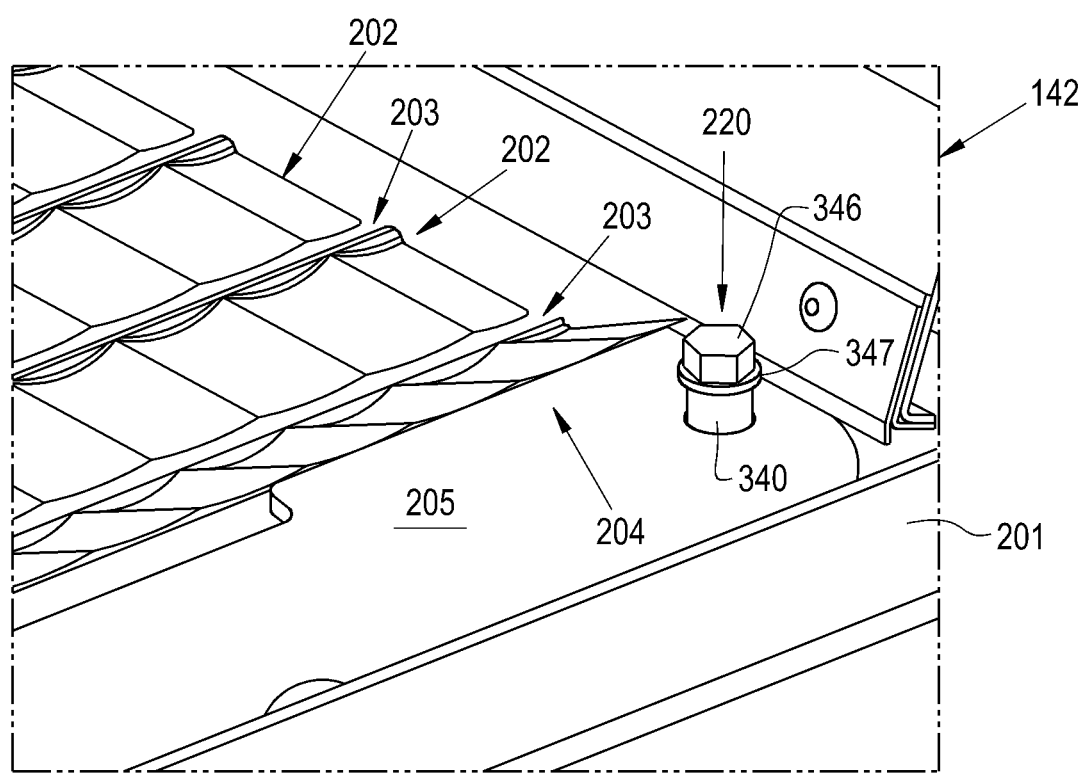
FIG. 2 illustrates a perspective view of the sieve of the cleaning system illustrated in FIG. 1, in accordance with an exemplary embodiment of the present disclosure.

Referring now to the drawings, and more particularly to FIG. 1, there is shown an embodiment of an agricultural harvester 100 in the form of a combine which generally includes a chassis 101, ground engaging wheels 102 and 103, header 110, feeder housing 120, operator cab 104, threshing and separating system 130, cleaning system 140, grain tank 150, and unloading conveyance 160. Front wheels 102 are larger flotation type wheels, and rear wheels 103 are smaller steerable wheels. Motive force is selectively applied to front wheels 102 through a power plant in the form of a diesel engine 105 and a transmission (not shown). Although combine 100 is shown as including wheels, is also to be understood that combine 100 may include tracks, such as full tracks or half tracks.

Header 110 is mounted to the front of combine 100 and includes a cutter bar 111 for severing crops from a field during forward motion of combine 100. A rotatable reel 112 feeds the crop into header 110, and a double auger 113 feeds the severed crop laterally inwardly from each side toward feeder housing 120. Feeder housing 120 conveys the cut crop to threshing and separating system 130, and is selectively vertically movable using appropriate actuators, such as hydraulic cylinders (not shown).

Threshing and separating system 130 is of the axial-flow type, and generally includes a threshing rotor 131 at least partially enclosed by a rotor cage and rotatable within a corresponding perforated concave 132. The cut crops are threshed and separated by the rotation of rotor 131 within concave 132, and larger elements, such as stalks, leaves and the like are discharged from the rear of combine 100. Smaller elements of crop material including grain and non-grain crop material, including particles lighter than grain, such as chaff, dust and straw, are discharged through perforations of concave 132. Threshing and separating system 130 can also be a different type of system, such as a system with a transverse rotor rather than an axial rotor, etc.

Grain which has been separated by the threshing and separating assembly 130 falls onto a grain pan 133 and is conveyed toward cleaning system 140. Cleaning system 140 may include an optional pre-cleaning sieve 141, an upper sieve 142 (also known as a chaffer sieve or sieve assembly), a lower sieve 143 (also known as a cleaning sieve), and a cleaning fan 144. Grain on sieves 141, 142 and 143 is subjected to a cleaning action by fan 144 which provides an air flow through the sieves to remove chaff and other impurities such as dust from the grain by making this material airborne for discharge from a straw hood 171 of a residue management system 170 of combine 100. Optionally, the chaff and/or straw can proceed through a chopper 180 to be further processed into even smaller particles before discharge out of the combine 100 by a spreader assembly 200. It should be appreciated that the "chopper" 180 referenced herein, which may include knives, may also be what is typically referred to as a "beater", which may include flails, or other construction and that the term "chopper" as used herein refers to any construction which can reduce the particle size of entering crop material by various actions including chopping, flailing, etc. Grain pan 133 and pre-cleaning sieve 141 oscillate in a fore-to-aft manner to transport the grain and finer non-grain crop material to the upper surface of upper sieve 142. Upper sieve 142 and lower sieve 143 are vertically arranged relative to each other, and likewise oscillate in a fore-to-aft manner to spread the grain across sieves 142, 143, while permitting the passage of cleaned grain by gravity through the openings of sieves 142, 143.

Clean grain falls to a clean grain auger 145 positioned crosswise below and toward the front of lower sieve 143. Clean grain auger 145 receives clean grain from each sieve 142, 143 and from a pan 146A of cleaning system 140. Clean grain auger 145 conveys the clean grain laterally to a generally vertically arranged grain elevator 151 for transport to grain tank 150. Tailings from cleaning system 140 fall to another pan 146 and a tailings auger trough 147. The tailings are transported via tailings auger 147 and return auger 148 to the upstream end of cleaning system 140 for repeated cleaning action. A pair of grain tank augers 152 at the bottom of grain tank 150 convey the clean grain laterally within grain tank 150 to unloader 160 for discharge from combine 100.

Referring now to FIGS. 2-5, an exemplary embodiment of a sieve, such as the upper sieve 142, is illustrated. In some embodiments, the upper sieve 142 is a self-leveling sieve. An exemplary self-leveling sieve is described by U.S. Pat. No. 4,897,071, which is incorporated in its entirety herein by reference. The sieve 142 includes a sieve frame 201, a plurality of adjustable louvers 202 carried by the sieve frame 201, at least one adjustment bar 310 (illustrated as one adjustment bar in FIG. 3), and an adjustment assembly 220. The louvers 202 define a plurality of apertures 203, which allow clean crop material, such as grain, to pass through to the clean grain auger 145. As crop material is provided to the sieve 142, the sieve 142 shakes fore-and-aft to move the crop material across a top side 204 defined by the frame 201 so the crop material passes over the apertures 203. The adjustment bar 310 is coupled to the louvers 202 such that displacement of the adjustment bar 310 changes a size of at least some of the apertures 203. Displacement of the adjustment bar 310 may, for example, cause pivoting of the louvers 202 about louver mounting pins 502 (illustrated in FIG. 5) that are coupled to the adjustment bar 310 to change the size of the apertures 203. It should be appreciated that the adjustment bar 310 may be coupled to the louvers 202 in other ways to adjust the size of the apertures 203.

The adjustment assembly 220 includes an adjustment arm 221 that is coupled to the adjustment bar 310. The adjustment arm 221 is pivotable relative to the sieve frame 201 such that pivoting of the adjustment arm 221 about a pivot axis PA displaces the adjustment bar 310. In some embodiments, the adjustment arm 221 carries the adjustment bar 310 to displace the adjustment bar 310 during displacement of the adjustment arm 221. The adjustment bar 310 may, for example, have a carried portion 311 disposed in a bar slot 222 formed in the adjustment arm 221 and coupled to a lock nut 223 that bears on the adjustment arm 221. The lock nut 223 may be loosely attached to the carried portion 311 so the adjustment bar 310 does not bend during pivoting of the adjustment arm 221.

Figure 3:
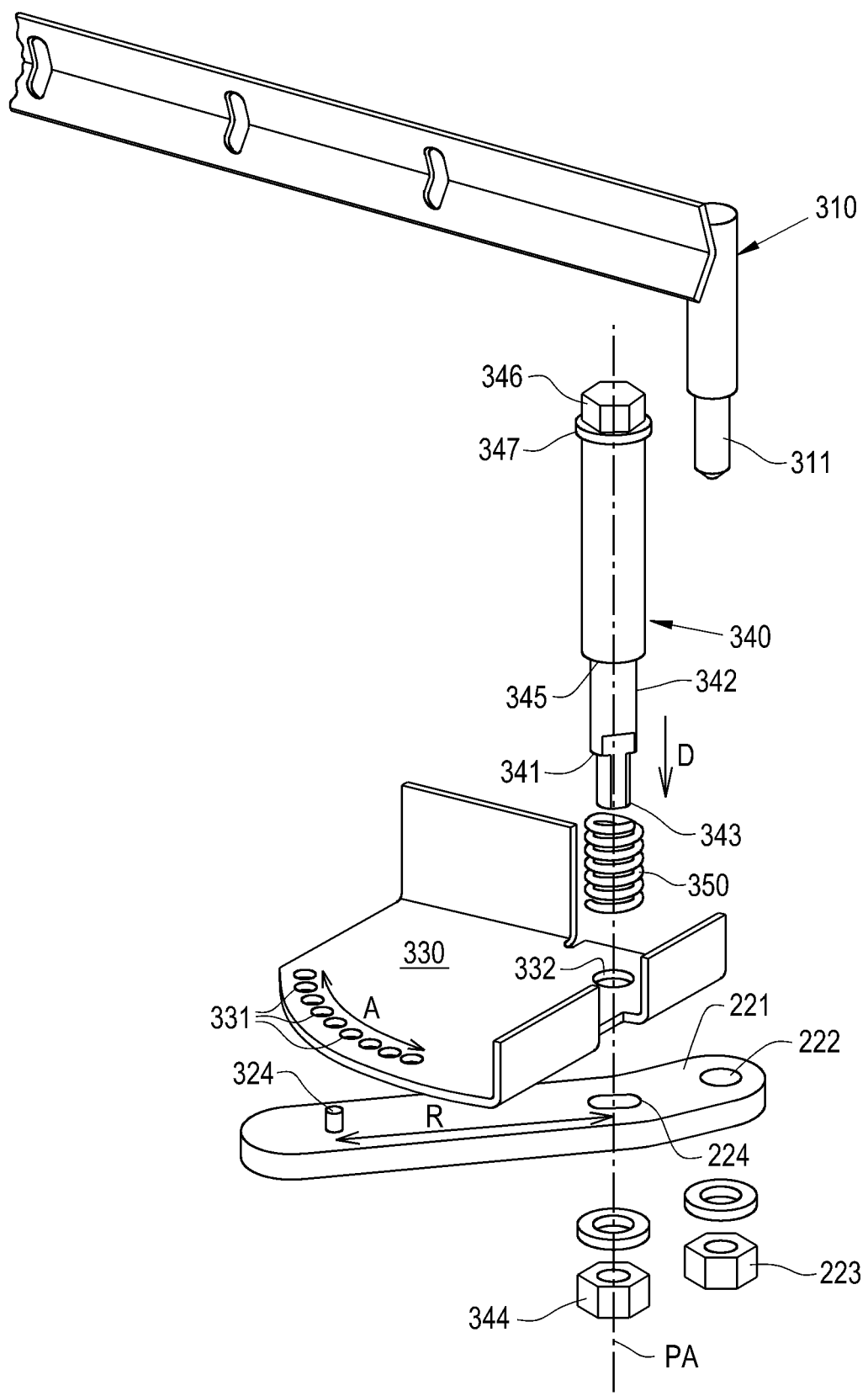
FIG. 3 illustrates an exploded view of an exemplary embodiment of an adjustment assembly and other components provided in the sieve of FIG. 2.
Figure 4:
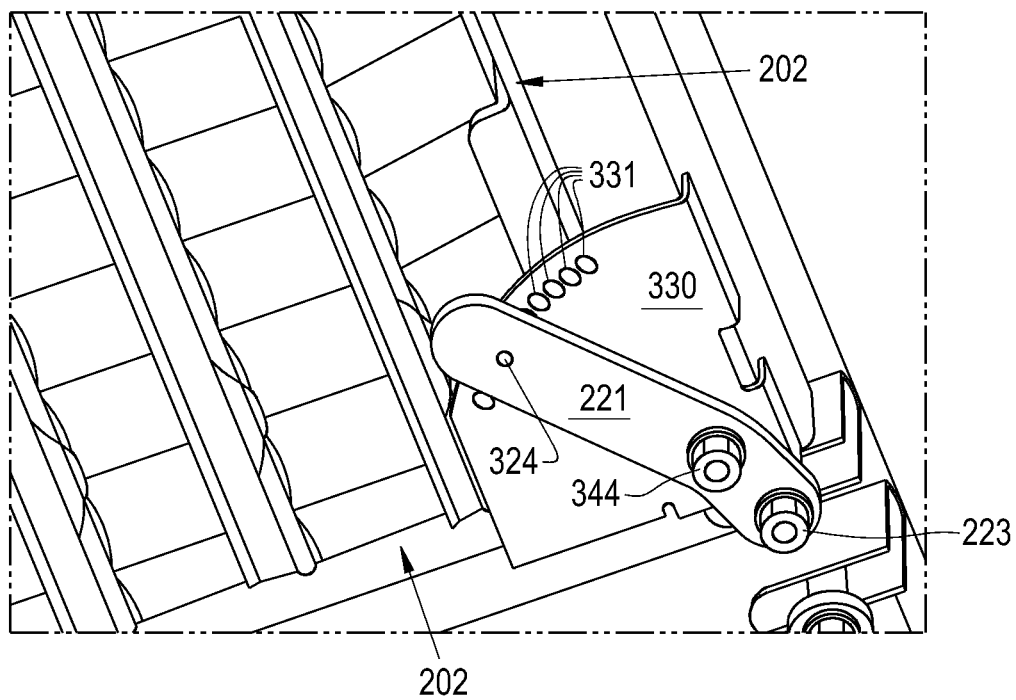
FIG. 4 illustrates another perspective view of the sieve illustrated in FIG. 2.
Figure 5:
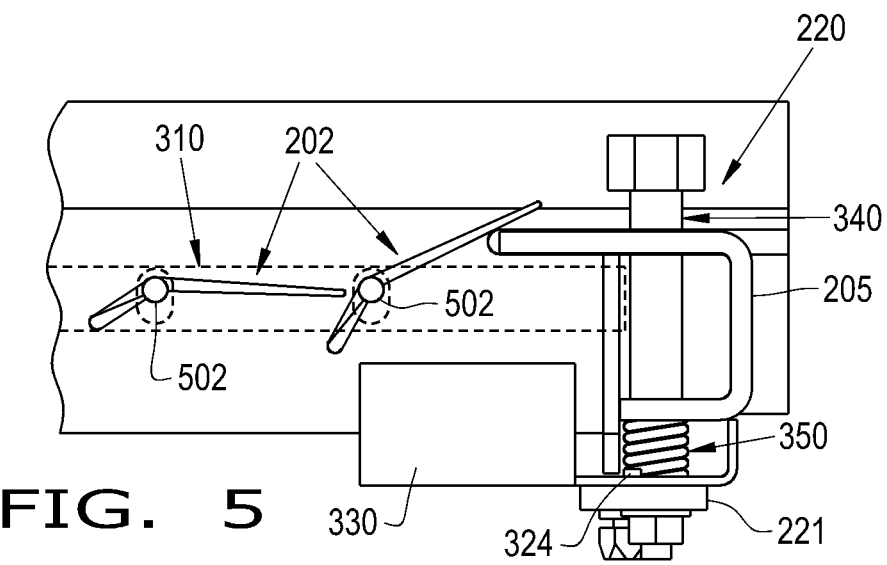
FIG. 5 illustrates a sectional side view of the sieve and adjustment assembly illustrated in FIGS. 2-4.

The adjustment arm 221 carries a locking pin 324, which may be a dowel pin or similar construction, that is displaceable between a locking position, illustrated in FIGS. 4-5, and an adjustment position, illustrated in FIG. 3. The adjustment arm 221 is not freely pivotable about the pivot axis PA when the locking pin 324 is in the locking position due to, for example, the locking pin 324 being disposed in one of a plurality of adjustment openings 331 of a locking plate 330. The locking pin 324 being disposed in the adjustment opening 331 prevents pivoting of the adjustment arm 221 due to abutment of the locking pin 324 against the locking plate 330, which may be static relative to the sieve frame 201. The adjustment openings 331 may be aligned along an arc A defined about the pivot axis PA with a radius R defined by the distance between the locking pin 324 and the pivot axis PA, so pivoting of the adjustment arm 221 tends to align the locking pin 324 with one of the adjustment openings 331. When the locking pin 324 is in the adjustment position, e.g., not disposed in one of the adjustment openings 331, the adjustment arm 221 is freely pivotable to displace the adjustment bar 310 and adjust the louvers 202 and apertures 203.

A shaft 340 is disposed on the top side 204 and coupled to the adjustment arm 221. The shaft 340 is displaceable such that displacement of the shaft 340 from a first position to a second position causes a corresponding displacement of the locking pin 324 from the locking position to the adjustment position. In some embodiments, the shaft 340 is displaceable from the first position to the second position in a direction D that is generally parallel to the pivot axis PA. In other words, the shaft 340 may be depressed downwardly to displace the locking pin 324 from the locking position to the adjustment position. The shaft 340 may include a bearing portion 342 that bears on the adjustment arm 221 and extends through a plate shaft opening 332 formed in the locking plate 330. As the shaft 340 displaces in the direction D, the adjustment arm 221 may also correspondingly displace in the direction D and carry the locking pin 324 from the locking position to the adjustment position. A portion of the shaft 340, such as an arm locking portion 341, may be disposed in and pivotably locked to a shaft opening 224 formed in the adjustment arm 221. The arm locking portion 341 may include, for example, a pair of opposed flat surfaces that engage respective flat surfaces of the shaft opening 224 to pivotably lock to the shaft opening 224. By pivotably locking the arm locking portion 341 to the adjustment arm 221, pivoting of the shaft 340 may cause a corresponding pivoting of the adjustment arm 221 about the pivot axis PA. The arm locking portion 341 may also extend through the plate shaft opening 332 without pivotably locking to the locking plate 330 in order to allow free pivoting of the adjustment arm 221. In some embodiments, the arm locking portion 341 is also pivotably locked to the plate shaft opening 332 when the shaft 340 is in the first position. The shaft 340 may also have a nut locking portion 343 coupled to a locking nut 344 to hold the portion 341 in the shaft opening 224 and couple the shaft 340 and the adjustment arm 221 together. Thus, the shaft 340 and the adjustment arm 221 may be coupled together such that displacement and pivoting of the shaft 340 can cause corresponding displacement and pivoting the adjustment arm 221 (and the carried locking pin 324) to adjust the louvers 202 and apertures 203.

In some embodiments, a spring 350 is disposed between the shaft 340 and the locking plate 330. The spring 350 may bear on a spring shoulder 345 formed in the shaft 340 that is larger than the bearing portion 342 and the plate shaft opening 332 formed in the locking plate 330 so displacement of the shaft 340 in the direction D is limited by abutment of the spring shoulder 345 against the fully compressed spring 350 and/or the locking plate 330. The spring 350 can bias the shaft 340 toward the first position so the adjustment arm 221 is biased toward a position where the locking pin 324 is in the locking position. The spring 350 tends to bias the shaft 340 toward the first position, with displacement of the shaft 340 in the direction D by, for example, a user overcoming the spring force of the spring 350 to displace the shaft 340 toward the first position to displace the locking pin 324 to the adjustment position. When the adjustment arm 221 pivots, the spring 350 tends to bias the adjustment arm 221 and the carried pin 324 toward the locking position so the locking pin 324 seats in an adjustment opening 331 of the locking plate 330 unless the shaft 340 is displaced to the second position. Thus, once the force displacing the shaft 340 to the second position is removed, the spring 350 can naturally return the locking pin 324 to the locking position in, for example, one of the adjustment openings 331.

The shaft 340 may further include a head 346 formed at a terminal end of the shaft 340 that is configured for engagement with a wrench. As illustrated in FIGS. 2-5, the head 346 may have a hexagonal shape that allows engagement of the head 346 by a hex wrench. The head 346 may be formed to have a smaller diameter than, for example, the portion of the shaft 340 including the spring shoulder 345 in order to provide a wrench bearing portion 347. The wrench bearing portion 347 provides a surface for supporting an engaged wrench during adjustment and also allows a user to displace the shaft 340 in the direction D by pushing the wrench down against the wrench bearing portion 347. Thus, the wrench bearing portion 347 can allow a user to easily displace and pivot the shaft 340, and the adjustment arm 221, to adjust the louvers 202 and apertures 203. In some embodiments, the head 346 of the shaft 340 is exposed above a cover 205 connected to the sieve frame 201; the rest of the shaft 340 and other components, such as the adjustment arm 221, may be disposed below the cover 205 to reduce the risk of crop material and other particles jamming or otherwise interfering with smooth operation.

Figure 6:
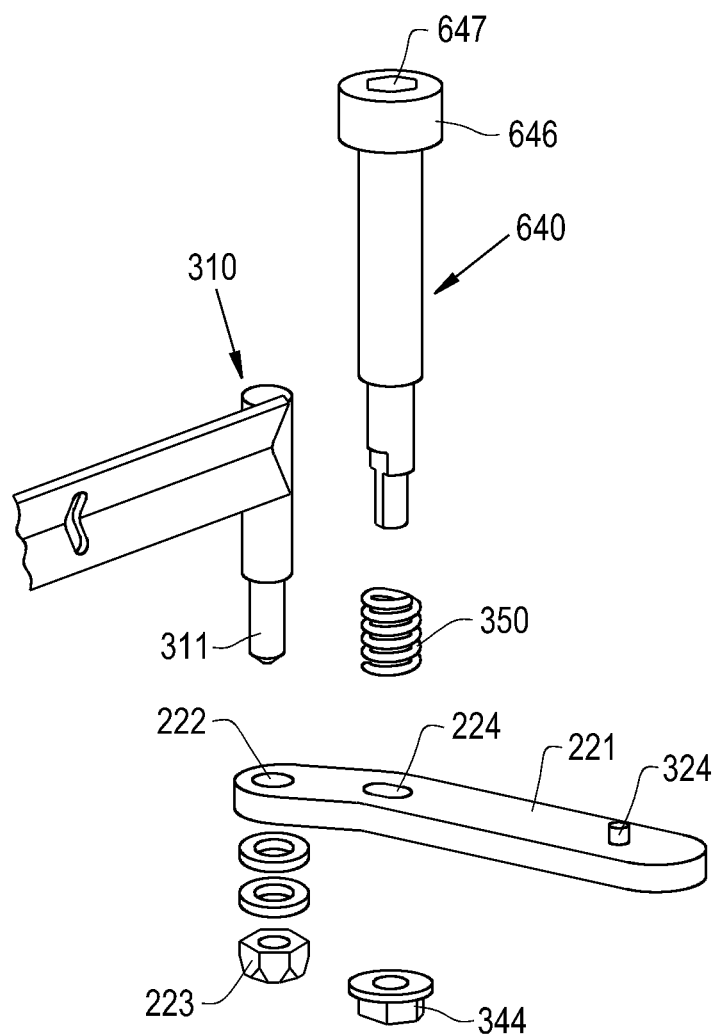
FIG. 6 illustrates the exploded view of the components in FIG. 3 with another exemplary embodiment of a shaft, in accordance with the present disclosure.
Figure 7:
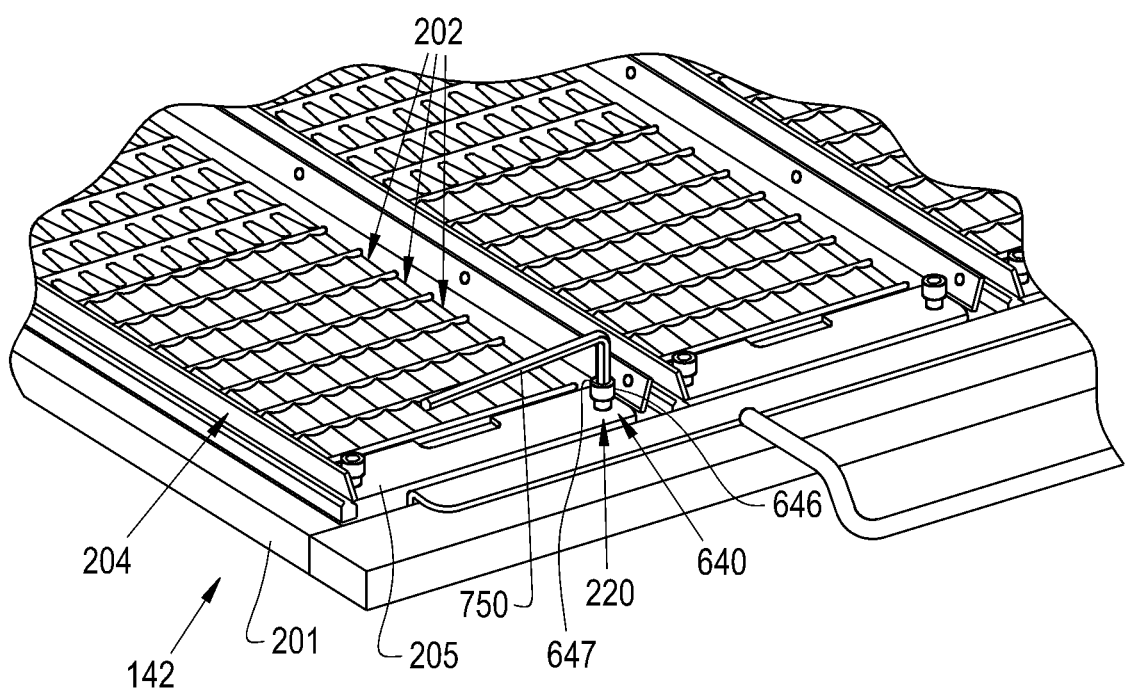
FIG. 7 illustrates an Allen wrench interacting with the shaft illustrated in FIG. 6 to adjust louvers of the sieve.

While the head 346 of the shaft 340 is illustrated and described as being a hexagonal-shaped head, it should be appreciated that the head 346 can be formed in a variety of different shapes for engagement with different types of wrenches. Referring now to FIGS. 6-7, an alternative embodiment of a shaft 640 is illustrated that is similar to the shaft 340 but includes a head 646 having a wrench engagement slot 647 formed therein that is shaped and sized to engage a wrench, such as an Allen wrench 750 illustrated in FIG. 7. To displace the shaft 640 from the first position to the second position, a user may press the wrench 750 into the wrench engagement slot 647 and push down. Once the shaft 640 is in the second position and the locking pin 324 is in the adjustment position, the wrench 750 can be rotated to pivot the shaft 640 and adjust the louvers 202 and apertures 203. When the louvers 202 are adjusted to the desired position, the wrench 750 can be removed from the wrench engagement slot 647 so the spring 350 forces the shaft 640 toward the first position and the locking pin 324 displaces into the locking position in one of the adjustment openings 331 of the locking plate 330. While the shafts 340 and 640 are illustrated as having a hexagonal-shaped head 346 or a head 646 with a slot 647, respectively, the shaft 340, 640 can be formed with a head having other shapes such as, for example, a head with a straight-head or Phillips-head slot, a TORX® head, or other shapes. The shaft 340, 640 can also be formed with a head that is configured to be manually engaged by a user, such as by including a wing nut at the head. Therefore, it should be appreciated that the shaft 340, 640 formed according to the present disclosure can be formed in a variety of ways that makes it easy and convenient for a user to adjust the louvers 202 and apertures 203.

From the foregoing, it should be appreciated that the sieve 142 formed according to the present disclosure has adjustable louvers 202 and apertures 203 that can be easily and conveniently adjusted by a user utilizing the adjustment assembly 220. The shaft 340, by being disposed on the top side 204, is readily accessible by a user and may be adjusted using common tools, or no tools at all, to adjust the louvers 202 and apertures 203. This is in contrast to known sieve constructions, which generally include adjustment mechanisms that are disposed on the bottom of the sieve and require removal of additional components to access. Thus, the sieve 142 formed according to the present disclosure provides easily and conveniently adjustable louvers 202 and apertures 203 that a user may adjust to change the cleaning performance of the sieve 142.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. A sieve for a cleaning system of an agricultural harvester, comprising:
   a sieve frame defining a top side;
   a plurality of adjustable louvers carried by the sieve frame and defining a plurality of apertures;
   at least one adjustment bar coupled to the plurality of adjustable louvers such that displacement of the at least one adjustment bar changes a size of at least some of the plurality of apertures; and
   an adjustment assembly comprising:
   an adjustment arm coupled to the at least one adjustment bar and pivotable relative to the sieve frame such that pivoting of the adjustment arm about a pivot axis displaces the at least one adjustment bar, the adjustment arm carrying a locking pin that is displaceable between a locking position where the adjustment arm is not freely pivotable about the pivot axis and an adjustment position where the adjustment arm is freely pivotable about the pivot axis; and a shaft disposed on the top side and coupled to the adjustment arm, the shaft being displaceable such that displacement of the shaft from a first position to a second position causes a corresponding displacement of the locking pin from the locking position to the adjustment position.

2. The sieve of claim 1, wherein the shaft is displaceable from the first position to the second position in a direction that is generally parallel to the pivot axis.

3. The sieve of claim 2, wherein the adjustment arm is displaceable in the direction that is generally parallel to the pivot axis, the shaft comprising a bearing portion bearing on the adjustment arm such that displacement of the shaft from the first position to the second position causes a corresponding displacement of the adjustment arm.

4. The sieve of claim 3, wherein the adjustment arm comprises a shaft opening and a portion of the shaft is pivotably locked to the adjustment arm in the shaft opening.

5. The sieve of claim 1, further comprising a locking plate comprising a plurality of adjustment openings, the locking pin being disposed in one of the adjustment openings in the locking position.

6. The sieve of claim 5, further comprising a spring disposed between the shaft and the locking plate, the shaft comprising a spring shoulder bearing on the spring, the spring biasing the shaft toward the first position.

7. The sieve of claim 6, wherein a portion of the shaft extends through a plate shaft opening formed in the locking plate.

8. The sieve of claim 1, wherein the shaft comprises a head configured for engagement with a wrench.

9. The sieve of claim 8, wherein the head comprises a wrench engagement slot formed therein.

10. A cleaning system for an agricultural harvester, comprising:
a sieve comprising:
a sieve frame defining a top side;
a plurality of adjustable louvers carried by the sieve frame and defining a plurality of apertures;
at least one adjustment bar coupled to the plurality of adjustable louvers such that displacement of the at least one adjustment bar changes a size of at least some of the plurality of apertures; and
an adjustment assembly comprising:
an adjustment arm coupled to the at least one adjustment bar and pivotable relative to the sieve frame such that pivoting of the adjustment arm about a pivot axis displaces the at least one adjustment bar, the adjustment arm carrying a locking pin that is displaceable between a locking position where the adjustment arm is not freely pivotable about the pivot axis and an adjustment position where the adjustment arm is freely pivotable about the pivot axis; and
a shaft disposed on the top side and coupled to the adjustment arm, the shaft being displaceable such that displacement of the shaft from a first position to a second position causes a corresponding displacement of the locking pin from the locking position to the adjustment position; and
a clean grain auger disposed below the sieve and configured to receive clean crop material that passes through the plurality of apertures.

11. The cleaning system of claim 10, wherein the shaft is displaceable from the first position to the second position in a direction that is generally parallel to the pivot axis.

12. The cleaning system of claim 11, wherein the adjustment arm is displaceable in the direction that is generally parallel to the pivot axis, the shaft comprising a bearing portion bearing on the adjustment arm such that displacement of the shaft from the first position to the second position causes a corresponding displacement of the adjustment arm.

13. The cleaning system of claim 12, wherein the adjustment arm comprises a shaft opening and a portion of the shaft is pivotably locked to the adjustment arm in the shaft opening.

14. The cleaning system of claim 10, further comprising a locking plate comprising a plurality of adjustment openings, the locking pin being disposed in one of the adjustment openings in the locking position.

15. The cleaning system of claim 14, further comprising a spring disposed between the shaft and the locking plate, the shaft comprising a spring shoulder bearing on the spring, the spring biasing the shaft toward the first position.

16. The cleaning system of claim 15, wherein a portion of the shaft extends through a plate shaft opening formed in the locking plate.

17. The cleaning system of claim 10, wherein the shaft comprises a head configured for engagement with a wrench.

18. The cleaning system of claim 17, wherein the head comprises a wrench engagement slot formed therein.

19. An agricultural vehicle, comprising:
a chassis; and
a cleaning system carried by the chassis, the cleaning system comprising:
a sieve comprising:
a sieve frame defining a top side;
a plurality of adjustable louvers carried by the sieve frame and defining a plurality of apertures;
at least one adjustment bar coupled to the plurality of adjustable louvers such that displacement of the at least one adjustment bar changes a size of at least some of the plurality of apertures; and
an adjustment assembly comprising:
an adjustment arm coupled to the at least one adjustment bar and pivotable relative to the sieve frame such that pivoting of the adjustment arm about a pivot axis displaces the at least one adjustment bar, the adjustment arm carrying a locking pin that is displaceable between a locking position where the adjustment arm is not freely pivotable about the pivot axis and an adjustment position where the adjustment arm is freely pivotable about the pivot axis; and
a shaft extending disposed on the top side and coupled to the adjustment arm, the shaft being displaceable such that displacement of the shaft from a first position to a second position causes a corresponding displacement of the locking pin from the locking position to the adjustment position; and
a clean grain auger disposed below the sieve and configured to receive clean crop material that passes through the plurality of apertures.

20. The agricultural vehicle of claim 19, wherein the shaft is displaceable from the first position to the second position in a direction that is generally parallel to the pivot axis and the adjustment arm is displaceable in the direction that is generally parallel to the pivot axis, the shaft comprising a bearing portion bearing on the adjustment arm such that displacement of the shaft from the first position to the second position causes a corresponding displacement of the adjustment arm.

* * * * *